United States Patent Office 3,755,478
Patented Aug. 28, 1973

3,755,478
CYCLIC PROCESS FOR THE PREPARATION OF DIORGANOMAGNESIUM COMPOUNDS
Conrad W. Kamienski, Gastonia, N.C., assignor to Lithium Corporation of America, New York, N.Y.
No Drawing. Filed Aug. 18, 1971, Ser. No. 172,931
Int. Cl. C07f 3/02
U.S. Cl. 260—665 R          11 Claims

ABSTRACT OF THE DISCLOSURE

A cyclic process for the preparation of diorganomagnesium compounds which involves, first, preparing a diorganomagnesium compound from magnesium metal and an organic chloride in a hydrocarbon medium; second, reacting the resulting mixture of diorganomagnesium and magnesium chloride with sufficient organolithium to react with the magnesium chloride to produce hydrocarbon-soluble diorganomagnesium compounds; third, separating therefrom the by-product lithium chloride and subsequently reacting it with an alkyl or aryl chloride and sodium metal to regenerate the organolithium compound which is then finally recycled to the reaction mixture obtained in the first step described above.

---

As described in copending applications Ser. No. 728,838, filed May 13, 1968, now abandoned, and Ser. No. 57,820, filed July 23, 1970, dialkylmagnesium compounds can be prepared from activated forms of magnesium chloride and alkyllithiums in inert hydrocarbon solvents according to the scheme:

$$2RLi + MgCl_2 \rightarrow R_2Mg + 2LiCl$$

It has now been discovered, in accordance with the present invention, that the lithium chloride by-product from this reaction is itself "active" and can be reconverted to alkyllithium compounds by reaction with sodium metal and an appropriate alkyl halide. These alkyllithium compounds can then be "recycled" to react with "active" magnesium chloride to produce dialkylmagnesium compounds, thus conserving the more costly lithium values. Thus, for example, a typical cyclic process to produce di-n-butyl-magnesium involves four steps, shown in the following equations:

(1)     $2Mg + 2\ n\text{-BuCl} \rightarrow (n\text{-Bu})_2Mg + MgCl_2$
(2)     $MgCl_2 + (n\text{-Bu})_2Mg + 1.6\ n\text{-BuLi} + 0.4\text{sec-BuLi} \rightarrow$
        $1.8(n\text{-Bu})_2Mg + 0.2(\text{sec-Bu})_2Mg + 2LiCl$
(3)     $2LiCl + 4Na + 2n\text{-BuCl} \rightarrow 1.6\ n\text{-BuLi} + 4NaCl$
(4)     n-BuLi from Step 3 to Step 2.

The addition of a small quantity of sec-butyllithium in Step 2 is utilized to produce di-sec-butylmagnesium, which solubilizes the di-n-butylmagnesium formed from the recycled n-butyllithium and "active" $MgCl_2$.

The aforesaid cyclic process principle is also applicable to the preparation of dialkylmagnesium compounds in hydrocarbon solutions containing small amounts of ethers or amines. For example, the presence of one-half an equivalent of diethyl ether is sufficient to promote complete solubilization of di-n-butyl magnesium in hydrocarbon solvents such as benzene or hexane. Thus, in this modification, the addition of small amounts of sec-butyllithium at Step 2 is unnecessary. A typical cyclic process using diethyl ether as a solvating agent is shown below:

(A)     $2Mg + 2\ n\text{-BuCl} + 0.5Et_2O \rightarrow$
        $(n\text{-Bu})_2Mg \cdot 0.5Et_2O\uparrow + MgCl_2\downarrow$
(B)     $MgCl_2$ (from Step 1) $+ 2\ n\text{-BuLi} + 0.5Et_2O \rightarrow$
        $(n\text{-Bu})_2Mg \cdot 0.5Et_2O\uparrow + 2LiCl\downarrow$
(C)     $2LiCl + 4Na + 2\ n\text{-BuCl} \rightarrow 2\ n\text{-BuLi} + 4NaCl$
(D)     n-BuLi from Step 3 recycled to Step 2

The activated $MgCl_2$ prepared in Step 1 or Step A above may come from a variety of sources as described in copending application Ser. No. 728,838. Thus, besides the direct preparation method of Step 1 or Step A in which diorganomagnesium compounds are also products, other methods of preparing activated $MgCl_2$ can be employed, such as reaction of Grignard reagents with active organic halides such as benzyl chloride or reaction of magnesium metal with alkyl halide in refluxing chlorobenzene. In the latter method, no diorganomagnesium compounds are formed as coproducts.

The process of this invention can be applied to the preparation of a wide variety of both pure and mixed diorganomagnesium compounds. Some representative diorganomagnesium compounds are diethylmagnesium, di-n-propyl magnesium, di - n - butylmagnesium, n-butyl-sec-butylmagnesium, n-amyl-tert-butylmagnesium, di-n-amyl-magnesium, phenyl-sec-butylmagnesium, diphenylmagnesium, and cyclopentyl-n-propylmagnesium. In general, where said diorganomagnesium compounds are dialkyl-magnesiums, the alkyl radicals can be the same or different and can contain from 2 to 12 carbon atoms but it is particularly preferred that they contain 4, 5 or 6 carbon atoms. As is also indicated by the foregoing examples, the organo radicals of said diorganomagnesium compounds can be aryl hydrocarbon, cyclic hydrocarbon, and aralkyl and alkaryl hydrocarbon, of which additional examples are phenyl; tolyl; xylyl; benzyl; naphthyl; methylnaphthyl; dimethylnaphthyl; ethylnaphthyl; phenylethyl; cyclopentyl-methyl; cyclohexyl-ethyl; cyclopentyl-ethyl; methylcyclopentyl - ethyl; 4 - cyclohexenyl - ethyl; alpha-naphthyl-ethyl; cyclopentyl; cyclohexyl; methylcyclopentyl; dimethylcyclopentyl; ethylcyclopentyl; methylcyclohexyl; dimethylcyclohexyl; ethylcyclo-hexyl; isopropylcyclohexyl; phenylcyclohexyl; cyclohexylbutyl; 2,7 - dimethylocta-2,6-dien-1,8-yl; 2,6-dimethylocta-2,6 - dien - 1, 8-yl; and bis($\alpha$-2-methylbutyl)-m-xylyl. Additional illustrative examples of the diorganomagnesium compounds are diisopropylmagnesium, isopropylisobutyl magnesium, di-s-butylmagnesium, s-butyl-n-amyl magnesium, diiso-amylmagnesium, dihexylmagnesiums, diheptylmagnesiums, dioctylmagnesiums, dinonylmagnesiums, s-butylisooctyl magnesium, didecylmagnesiums, didodecylmagnesiums, dicyclohexylmagnesium, dicyclooctylmagnesium, di-p-tolylmagnesium, di-p-anisylmagnesium, dibenzylmagnesium and dixylylmagnesiums.

The organic solvents in which the reactions are carried out can be widely varied. Purely hydrocarbon media can be utilized such as benzene, hexane, heptane, cyclohexane or mixtures thereof. Mixtures of hydrocarbon media with Lewis bases such as diethylether, triethylamine, tetrahydrofuran, or N,N,N',N'-tetramethylethylenediamine can also be employed. Purely Lewis base media such as described heretofore can also be used. Generally speaking, the particular solvent system to be used will depend upon the specific application for the diorganomagnesium compound. Thus, for example, where the compound is to be used in Zeigler or anionic catalysts for stereospecific polymerizations of conjugated dienes, a purely hydrocarbon solvent system is best employed. For synthetic applications where the diorganomagnesium compound is to be used as an intermediate similar to Grignard reagents of the type RMgX, the presence of Lewis base generally does not hinder, and, in fact commonly promotes the reactivity of the compounds.

Additional illustrative examples of the Lewis bases, notably ethers and aliphatic tertiary amines, are dimethyl ether, diisopropyl ether, di-n-butyl ether and diisobutyl ether; dialkyl ethers of aliphatic polyhydric alcohols such as dimethyl ether of ethylene glycol, diethyl ether of ethylene glycol, diisopropyl ether of ethylene glycol and diisopropyl ether and diethylene glycol, and dimethyl-, diethyl- and diisopropyl ethers of propylene glycol, cyclic alkyl ethers such as tetrahydrofuran (THF), tetrahydropyran (THP), dioxane, and 7-oxa [2,2,1]-bicycloheptane (OBH); and liquid ethers in the form of azaoxa-alkanes, azaalkoxacycloalkanes or oxa-alkylazacycloalkanes which can be represented by the formulae:

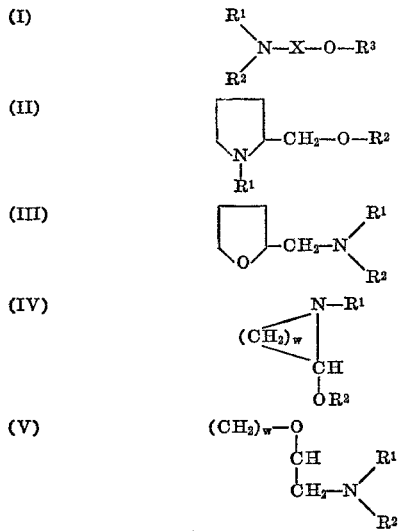

where $R^1$, $R^2$ and $R^3$ are the same or different alkyls each containing from 1 to 4 carbon atoms, namely, methyl, ethyl, n-propyl, isopropyl, n-butyl, isobutyl and tert-butyl; X is a non-reactive group such as —$CH_2$—$CH_2$—,

—$CH_2$—$CH_2$—$CH_2$—,

—$CH_2$—$CH$—$CH_2$—
    |
    $CH_3$ or other divalent aliphatic hydrocarbon or alkylene radicals, preferably containing from 2 to 4 carbon atoms; and $w$ is 1 to 4. Illustrative examples of such ethers include, for instance, 2-dimethylaminoethylmethyl ether

[($CH_3$)—N—$CH_2$—$CH_2$—O—$CH_3$];

2-diethylaminoethyl methyl ether

[($C_2H_5$)$_2$—N—$CH_2$—$CH_2O$—$CH_3$];

and di-dimethylaminopropylmethyl ether

[($CH_3$)$_2$—N—$CH_2$—$CH_2$—$CH_2$—O—$CH_2$]

An illustrative dioxacycloalkane is 2,2'-di (tetrahydrofuranyl)

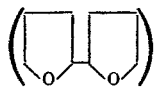

trimethylamine, triisopropylamine and tributylamine; those which are disclosed in U.S. Pat. No. 3,206,519, and British Pat. No. 1,051,269 which, for this showing, are herewith incorporated by reference.

The reaction of an activated lithium chloride by-product obtained from an organolithium preparation with sodium and an organic chloride to generate more of an organolithium compound is, per se, a well known reaction and is described in U.S. Pats. 3,293,313 and 3,155,-736. As indicated in these patents, ordinary anhydrous lithium chloride prepared by neutralization of lithium hydroxide with hydrochloric acid followed by dehydration of the resulting brine in known plant processes will not react with sodium metal and an organic halide.

As pointed out above, according to the present invention, it has been unexpectedly discovered that lithium chloride derived from other anhydrous processes reacts with sodium metal and organic halides. Thus, for example, as described previously in this disclosure, the lithium chloride obtained as a by-product in the reaction of "activated" magnesium chloride with two equivalents of an organolithium compound, readily reacts with two equivalents of sodium metal and one equivalent of an organic halide in hydrocarbon media to give organolithium compounds in good yields. The sodium metal is generally used in the form of a dispersion in hydrocarbon media. The halides contemplated by the present invention are chlorine and bromine, especially chlorine.

The main advantage of the present invention, which includes a step for converting the by-product lithium halide back to the organolithium compound used in the said process, is an economical one. The use of relatively inexpensive sodium metal to convert the lithium halide to an organolithium compound coupled with the saving effected by virtue of the ability to reuse the relatively expensive lithium halide, particularly the chloride by-product, makes the cyclic process of the present invention an economically advantageous one for the preparation of diorganomagnesium compounds.

The following schematic reaction diagram depicts the essential elements of this disclosure, X depicting chlorine or bromine and R depicting the organo radical.

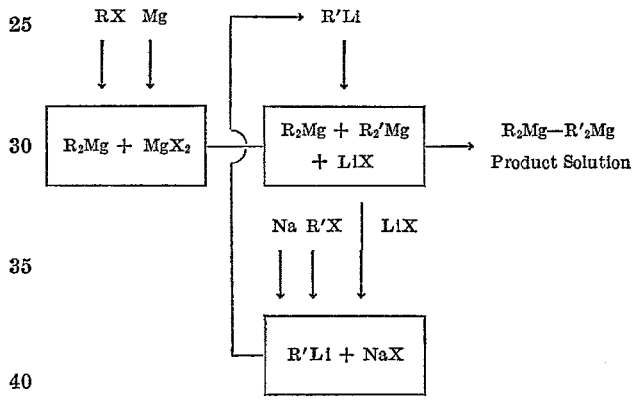

Note: The $MgX_2$ produced in the first step of this process, as indicated above, can be derived by processes other than the one shown.

The following examples of the process are illustrative of the invention and are not meant to restrict the invention in any way.

EXAMPLE 1

50 ml. of a slurry of $MgCl_2$ in hexane containing 3.6 meq. of chloride ion per ml., derived through the reaction of equivalent quantities of magnesium metal powder and n-butyl chloride in refluxing chlorobenzene, is treated with 90 ml. of a 1.82 N sec-butyllithium solution in hexane (164 meq.) and the mixture is ground in a ceramic ball mill for 20 hours at ambient temperature (25 ml. of hexane is added to wash in the reactants). Aliquots of the resultant slurry are removed and centrifuged. The clear supernatant solution is analized and found to be 0.74 N in Mg, 0.76 N in active alkyl content, and 0.72 N in total alkalinity. The residual solids from the centrifuged slurry are washed three times with hexane and then transferred to a 250 ml. 3-necked flask using approximately 200 ml. of hexane. The solids represent approximately 180 meq. of chloride ion of which 90% is LiCl, the remainder $MgCl_2$. 16.6 g. of a 50 weight percent sodium dispersion in mineral oil (8.3 g. of sodium—0.36 gram -atom) is added to the slurry, the mixture stirred up and allowed to settle. A portion of the clear supernatant is removed leaving approximately 125–150 ml. of slurry. A solution of 18.8 ml. (16.7 g., 0.18 mole) of n-butyl chloride diluted to 44 ml. with hexane is added slowly to the stirred slurry, while keeping the temperature between 30 and 35° C. The mixture slowly darkens to a bluish-purple color. After stirring the mixture for an additional 30 minutes, the solution is filtered off (175 ml.) and analyzed. The solution is found to be 0.53 N in total alkalinity, 0.47 N in Li, and 0.06 N in mg. No organic chloride is left over and the yield of n-butyllithium, based on LiCl, is 50%. The resulting solution of n-butyllithium in hexane is then further reacted with the products of the reaction of 0.08 gram-atom of magnesium metal powder and 0.08 mole of n-butyl chloride in cyclohexane. A slurry of di-n-butylmagnesium in cyclohexane is produced.

EXAMPLE 2

13.4 g. of −200 mesh magnesium powder slurried in 50 ml. of methylcyclohexane is reacted with a solution of 53.8 (0.5 moles) of n-amylchloride in 200 ml. of methylcyclohexane at 80° C. with vigorous stirring. The halide solution is added over a period of 3.5 hours. 50 ml. of solvent is added and heating at 80° C. and stirring continued for an additional 2 hours. The mixture is allowed to cool and 290 ml. of a 1.2 N sec-butyllithium solution added in 3 portions with stirring. After stirring for 30 minutes, the mixture is filtered to give a clear colorless solution. After washing the solids with 100 ml. of hexane, a total of 650 ml. of a 1.1 N solution of a 1:1 mixture of di-n-amyl- and di-sec-butylmagnesium compounds is obtained. The residue, containing some unreacted $MgCl_2$ and LiCl, is treated further with portions of 1.2 N sec-butyllithium in hexane solution until excess lithium is present in solution. The residue from filtration representing approximately 0.5 moles of LiCl is then washed several times with hexane and reacted with sodium dispersion and n-amylchloride as described in Example 1 above to yield a solution of n-amyllithium in hexane (70%). The resulting n-amyllithium solution is reacted in a ball mill with an activated form of $MgCl_2$ derived by reacting magnesium metal powder with n-butyl chloride in refluxing chlorobenzene. A slurry of di-n-amyl-magnesium in hexane is produced, which is readily solubilized by mixing it with a portion of the 1:1 mixed di-n-amyl-di-sec-butylmagnesium solution produced in the first step above or by adding 0.5 equivalents of diethyl ether.

EXAMPLE 3

The first step of Example 2 is repeated except that 0.25 gram-moles of diethyl ether is added for each gram-atom of magnesium metal empolyed. After the reaction is over, the resulting solution of di-n-amylmagnesium in methylcyclohexane is filtered off and the residue of activated $MgCl_2$ reacted with two equivalents of n-amyllithium in hexane. The product solution of di-n-amylmagnesium (containing a small amount of diethyl ether) is filtered off and the washed residue of LiCl is then reacted with sodium metal and n-amylchloride in hexane to regenerate n-amyllithium which is recycled to the process.

I claim:
1. In a cyclic process for the preparation of diorganomagnesium compounds, the steps which comprise:
   (a) reacting magnesium metal, in an inert liquid hydrocarbon medium, with RX, where R is a hydrocarbyl radical selected from the group of $C_2$-$C_{12}$ alkyl, cycloalkyl, aryl, arlkyl and alkaryl, and X is a halide selected from the group of chlorine and bromine, to produce $R_2Mg$ and $MgX_2$,
   (b) reacting said mixture of $R_2Mg$ and $MgX_2$ in an inert liquid hydrocarbon with an organolithium compound in which the organo radical is a hydrocarbyl radical selected from the group of $C_2$ to $C_{12}$ alkyl, cycloalkyl, aryl, aralkyl and alkaryl to produce a mixture of diorganomagnesium compound and LiX.
   (c) substantially separating said LiX from the reaction mixture of step (b) and reacting said LiX with a dispersion of sodium metal in an inert liquid medium and in the presence of RX to produce R-Li and NaX, and
   (d) then recycling the R-Li produced in step (c) by reacting it with $MgX_2$ to produce additional $R_2Mg$ and LiX as specified in step (b).

2. In a cyclic process for the preparation of dibutylmagnesium compounds, the steps which comprise:
   (a) reacting magnesium metal with n-butylchloride in an inert liquid hydrocarbon medium to produce di-n-butylmagnesium and magnesium chloride,
   (b) reacting said mixture of di-n-butylmagnesium and magnesium chloride in an inert liquid hydrocarbon medium with n-butyllithium and sec-butyllithium to produce a mixture of di-n-butylmagnesium, di-sec-butylmagnesium and lithium chloride,
   (c) substantially separating said lithium chloride from the reaction mixture of step (b) and reacting said lithium chloride with a dispersion of sodium metal in an inert liquid medium and in the presence of n-butylchloride to produce n-butyllithium and in the presence of n-butylchloride to produce n-butyllithium and sodium chloride, and
   (d) then recycling the n-butyllithium produced in step (c) by reacting it with magnesium chloride to form additional di-n-butylmagnesium and lithium chloride as specified in step (a).

3. The process of claim 1, wherein steps (a) and (b) are carried out in the presence of at least one member selected from the group consisting of ethers and amines.

4. The process of claim 1, where steps (a) and (b) are carried out in the presence of diethyl ether.

5. In a cyclic process for the preparation of dialkylmagnesium compounds, the steps which comprise:
   (a) reacting magnesium metal with a $C_4$–$C_5$ alkyl chloride in an inert liquid hydrocarbon medium in the presence of at least one member selected from the group consisting of ethers and amines to produce magnesium chloride and a solution of a di-$C_4$–$C_5$-alkylmegnesium in said hydrocarbon medium,
   (b) substantially separating the megnesium chloride produced in step (a) and reacting it with a $C_4$–$C_5$ alkyllithium in the presence of a member selected from the group consisting of ethers and amines to produce a di-$C_4$–$C_5$-alkylmagnesium complex and lithium chloride,
   (c) substantially separating the lithium chloride from step (b) and reacting it with a $C_4$–$C_5$ alkyl chloride and a dispersion of sodium metal in an inert liquid medium to produce a $C_4$–$C_5$-alkyllithium and sodium chloride, and
   (d) then recycling the $C_4$–$C_5$-alkyllithium produced in step (c) by reacting it with magnesium chloride to form additional di-$C_4$–$C_5$-alkylmagnesium complex and lithium chloride as specified in step (b).

6. In a cyclic process for the preparation of dibutylmagnesium compounds, the steps which comprise:
   (a) reacting magnesium metal with n-butyl chloride in an inert liquid hydrocarbon medium in the presence of at least one member selected from the group consisting of ethers and amines to produce magnesium chloride and a solution of di-n-butylmagesium in said hydrocarbon medium,
   (b) substantially separating the magnesium chloride produced in step (a) and reacting it with a n-butyllithium in the presence of a member selected from the group consisting of ethers and amines to produce a di-n-butylmagnesium complex and lithium chloride,
   (c) substantially separating the lithium chloride from step (b) and reacting it with n-butyl chloride and a dispersion of sodium metal in an inert liquid medium to produce n-butyllithium and sodium chloride, and
   (d) then recycling the n-butyllithium produced in step (c) by reacting it with magnesium chloride to form additional di-n-butylmagnesium complex and lihtium chloride as specified in step (b).

7. In a cyclic process for the preparation of diorganomagnesium compounds, the steps which comprise:

(a) reacting a mixture of $R_2Mg$ and an "activated" magnesium chloride, where R is a hydrocarbyl radical selected from the group of $C_2$-$C_{12}$ alkyl, cycloalkyl, aryl, aralkyl and alkaryl, in an inert liquid hydrocarbon medium, with an organolithium compound represented by the formula R-Li where R is a hydrocarbyl organo radical selected from the group of $C_2$ to $C_{12}$ alkyl, cycloalkyl, aryl, aralkyl and alkaryl to produce a mixture of diorganomagnesium compound and lithium chloride, (b) substantially separating said lithium chloride from the reaction mixture of step (a) and reacting said lithium chloride with a dispersion of sodium metal in an inert liquid medium and in the presence of R—Cl to produce R—Li and sodium chloride, and (c) then recycling the R—Li produced in step (b) by reacting it with magnesium chloride to produce additional $R_2Mg$ and lithium chloride as specified in step (a).

8. The process of claim 7, wherein R is $C_4$-$C_5$ alkyl.

9. The process of claim 8, wherein step (a) is carried out in the presence of at least one member selected from the group consisting of ethers and amines.

10. The process of claim 8, wherein step (a) is carried out in the presence of diethyl ether.

11. In a cyclic process for the preparation of dibutylmagnesium compounds, the steps which comprise:

(a) reacting a mixture of di-n-butylmagnesium with an "activated" magnesium chloride in an inert liquid hydrocarbon medium with n-butyllithium and sec-butyllithium to produce a mixture of di-n-butylmagnesium, di-sec-butylmagnesium and lithium chloride, (b) substantially separating said lithium chloride from the reaction mixture of step (a) and reacting said lithium chloride with a dispersion of sodium metal in an inert liquid medium and in the presence of n-butylchloride to produce n-butyllithium and sodium chloride, and (c) then recycling the n-butyllithium produced in step (b) by reacting it with di-n-butylmagnesium and magnesium chloride to produce additional di-n-butylmagnesium and lithium chloride as specified in step (a).

References Cited
UNITED STATES PATENTS

| | | | |
|---|---|---|---|
| 3,155,736 | 11/1964 | Beumel | 260—665 R |
| 3,293,313 | 12/1966 | Borowski | 260—665 R |
| 3,646,231 | 2/1972 | Kamienski et al. | 260—665 R |

DANIEL E. WYMAN, Primary Examiner

A. P. DEMERS, Assistant Examiner

U.S. Cl. X.R.

260—665 G; 423—498